Patented Aug. 21, 1928.

1,681,753

UNITED STATES PATENT OFFICE.

HENRY HERMAN STORCH, OF NEW YORK, N. Y., ASSIGNOR TO THE ROESSLER & HASS-LACHER CHEMICAL COMPANY, OF NEW YORK, N. Y., A CORPORATION OF NEW YORK.

SYNTHESIS OF METHANOL.

No Drawing.     Application filed June 4, 1927. Serial No. 196,631.

This invention relates to the synthesis of methanol from hydrogen and carbon monoxide and specifically has for its object the preparation and use of a catalyst containing palladium for this synthesis. In this reaction the gases combine chiefly in accordance with the following equation: $2H_2 + CO = CH_3OH$.

I have discovered that palladium in several combinations will catalyze this reaction. I have found that palladium combined with a non-reducible metal oxide is especially useful. By non-reducible oxides, I mean oxides which are non-reducible or are difficultly reducible under the conditions of methanol formation, especially as described below. In general these are oxides which are not reduced, or, at most, only to a very slight degree when a gas mixture composed of hydrogen saturated with methanol is passed over them while heated to 150–300° C. This catalyst is active under combinations of relatively low temperatures and pressures as will be noted below. Use of powdered portions of this catalyst is also easy since it adapts itself to compression to pill form and retains this form satisfactorily throughout the reduction to the active stage and during use.

Some examples of my catalysts are:
Palladium + chromic oxide $(Pd + Cr_2O_3)$.
Palladium + zinc oxide $(Pd + ZnO)$.
Palladium + cerium oxide $(Pd + Ce_2O_3)$.

My method of preparation of these catalysts is shown by the following:

I. $Pd + Cr_2O_3$. 50 parts by weight of 7 mesh pumice were mixed with 25 parts palladium nitrate solution containing 0.199 parts $Pd(NO_3)_2$ per cubic centimeter; 5 parts chromic acid crystals were then added, the mixture evaporated to dryness, and then further heated at 200° C. until the water and all traces of nitrogen oxides had been driven off.

This granular mass was now reduced by heating at 150° C.–200° C. in a copper lined vessel and subjecting it at atmospheric pressure to a reducing gas mixture.

I have utilized various reducing gases such as hydrogen or mixtures of hydrogen with carbon monoxide or methanol or both, with and without dilution with nitrogen. I prefer to reduce with hydrogen saturated at room temperature with methanol. In order to prevent large uncontrollable increases in temperature during reduction it is usually desirable to dilute the reducing gas with nitrogen or other inert gas. For example, a satisfactory mixture would be 3 volumes hydrogen, 2 volumes methanol vapor and 95 volumes nitrogen. This reducing mixture is passed at atmospheric pressure over the dried precipitate preferably contained in a copper lined vessel and heated to not over 350° C. and preferably to about 150–200° C.

II. 365 parts by weight of zinc nitrate $[Zn(NO_3)_2.6H_2O]$ were dissolved in 1000 parts of water; to this solution was added 25 parts of a palladium nitrate $[Pd(NO_3)_2]$ solution containing 0.199 parts $[Pd(NO_3)_2]$ to one part of water. Sufficient sodium hydroxide solution was now added to make the mixture slightly alkaline and the whole boiled for about 15 minutes. The precipitate was now filtered out, washed until the wash water gave no test for nitrates, and the cake then dried at a temperature of about 150° C. The dried precipitate was then reduced with the nitrogen-hydrogen gas mixture at 150° C.–200° C.

These reduced catalysts are usually of a hard, firm, brittle structure suited for any methanol synthesis system. In some cases this catalyst may not have the desired mechanical strength necessary for a self supporting catalyst. I then prefer to completely pulverize the dry filter cake before reduction and compress the powder into small compact masses of any desired form such as pills. I have obtained excellent results and in general somewhat increased yields over the powdered or granular catalysts by utilizing pills of about ¼ inch in diameter and about ⅛ inch thick. After compression into pills the catalyst is subjected to reduction as before, and is then ready for use in the same manner as granular catalysts.

In employing the catalyst for methanol synthesis from hydrogen and carbon monoxide it is desirable to use gases substantially free from the common catalyst poisons which may be present in the raw materials, such as, for example, arsenic, sulphur, phosphorus, volatile iron compounds, or other deleterious constituents gathered during the gas production.

The above catalysts have been used in the synthesis of methanol from hydrogen with carbon monoxide and have given good results as illustrated by the following data.

A. $Pd+Cr_2O_3$ catalyst as prepared above. The granular catalyst material was packed in a copper lined high pressure steel bomb, and the whole heated to about 300° C. The gas mixture comprising essentially 4 volumes hydrogen and 1 volume carbon monoxide, and essentially free of catalyst poisons was now passed into the heated catalyst under a pressure of about 200 atmospheres and at a space velocity per hour (S. V. H.) equivalent to about 4700 cubic feet of gas per cubic foot of catalyst per hour, calculated at normal temperature and pressure (N. T. P.—0° C. and 1 atmosphere). During this reaction the temperature of the catalyst mass was about 350° C. A sustained yield of methanol was obtained equivalent to a space time yield (S. T. Y.) of about 440 pounds of methanol per cubic foot of catalyst per 24 hours. The methanol formed was recovered from the off-gases by cooling while still under pressure. The product was about 90% methanol and about 10% water.

B. $Pd + ZnO$. This catalyst as prepared above when utilized in a methanol synthesis under conditions as described above at a S. V. H. of about 4600 gave an S. T. Y. of about 375.

C. I have also utilized $Pd+Ce_2O_3$ catalyst prepared by analogous methods and obtained substantial yields of methanol.

The exact quantities, proportions, etc. given in the preferred examples of catalyst manufacture may be varied, and my catalysts will still be obtained, and I therefore do not wish to be definitely restricted to the examples given. Nor do I wish to be limited in the utilization of these catalysts to the preferred examples of methanol manufacture which I have given by way of illustration. These catalysts are of high activity and hence will operate over a large range of varying conditions, all combinations of which need not be given. I have used these catalysts under many conditions and find that wide limits of pressure and temperature are permissible. All the factors such as, temperature, S. V. H., pressure, etc. may be varied in order to secure various S. T. Y.'s or percent conversions which may be desired because of mechanical and thermal control or for manufacturing economies. The off-gases may be recirculated, after separation of the methanol, with or without replenishment.

These catalysts have also given good results with gas mixtures where the ratio of hydrogen to carbon monoxide was less as well as greater than that given in my preferred examples. My catalysts will form methanol from a gas mixture having any ratio of hydrogen to carbon monoxide, but if the ratio is below one to one by volume the S. T. Y. will be considerably lower than that obtained with hydrogen in excess by volume. In general I prefer not to use less hydrogen than that requred theoretically by the equation $2H_2+CO=CH_3OH$. I have found that a gas containing about four volumes of hydrogen to each volume of carbon monoxide gives the best results, and that with about 6 volumes of hydrogen the S. T. Y. is somewhat lower. For economic reasons I therefore prefer not to exceed 6 volumes of hydrogen for each volume of carbon monoxide, but I do not wish to be limited to this amount since methanol will be formed with the higher hydrogen ratios.

These catalysts are suited for the above syntheses at temperatures ranging between 150° C. and 450° C. although I have found the best results are secured between 300° C. and 400° C. Within the temperature limits given above, methanol will be formed in substantial amounts by these catalysts at pressures of 5 atmospheres and upwards, dependent on the temperature used. Substantial yields of methanol may even be obtained at pressures lower than this; for example, at one atmosphere. Under such conditions, however, the S. T. Y. is in general so much lower that the process would not be economical. In general, I have found that the best results are secured between 200 and 300 atmospheres, but I do not wish to be limited to this range. The catalsysts will form methanol under the pressure and temperature limits given above at any space velocity. Because of economic reasons, however, I prefer space velocities of 2,000 to 20,000, calculated at N. T. P.

Claims:

1. A catalyst for the production of methanol which comprises palladium and chromic oxide.

2. Process for the production of methanol which comprises passing a gaseous mixture of hydrogen and carbon monoxide containing an excess of hydrogen, under a pressure above atmospheric, in contact with a heated catalyst comprising palladium and a non-reducible metal oxide.

3. Process for the production of methanol which comprises passing a gaseous mixture of hydrogen and carbon monoxide containing an excess of hydrogen, under a pressure above atmospheric, in contact with a heated catalyst comprising palladium and chromic oxide.

4. Process for the production of methanol which comprises passing a gaseous mixture of hydrogen and carbon monoxide containing an excess of hydrogen, under a pressure of between 5 and 300 atmospheres, in contact with a heated catalyst comprising palladium and a non-reducible metal oxide said catalyst being heated to a temperature of between 150–450° C.

5. Process for the production of methanol which comprises passing a gaseous mixture of hydrogen and carbon monoxide containing an excess of hydrogen, under a pressure of between 5 and 300 atmospheres, in contact with a heated catalyst comprising palladium and chromic oxide.

6. Process for the production of methanol which comprises passing a gaseous mixture of hydrogen and carbon monoxide containing an excess of hydrogen under a pressure of about 200 atmospheres in contact with a heated catalyst consisting of palladium and a non-reducible metal oxide, said catalyst being maintained at a temperature of between 300–400° C.

7. Process for the production of methanol which comprises passing a gaseous mixture of hydrogen and carbon monoxide containing an excess of hydrogen under a pressure of about 200 atmospheres in contact with a heated catalyst comprising palladium and chromic oxide, said catalyst being maintained at a temperature of between 300–400° C.

Signed at Perth Amboy in the county of Middlesex and State of New Jersey this 2nd day of June, A. D. 1927.

HENRY HERMAN STORCH.